(No Model.)
I. NEWELL.
CONDENSER FOR WOOL CARDING MACHINES.
No. 315,054. Patented Apr. 7, 1885.
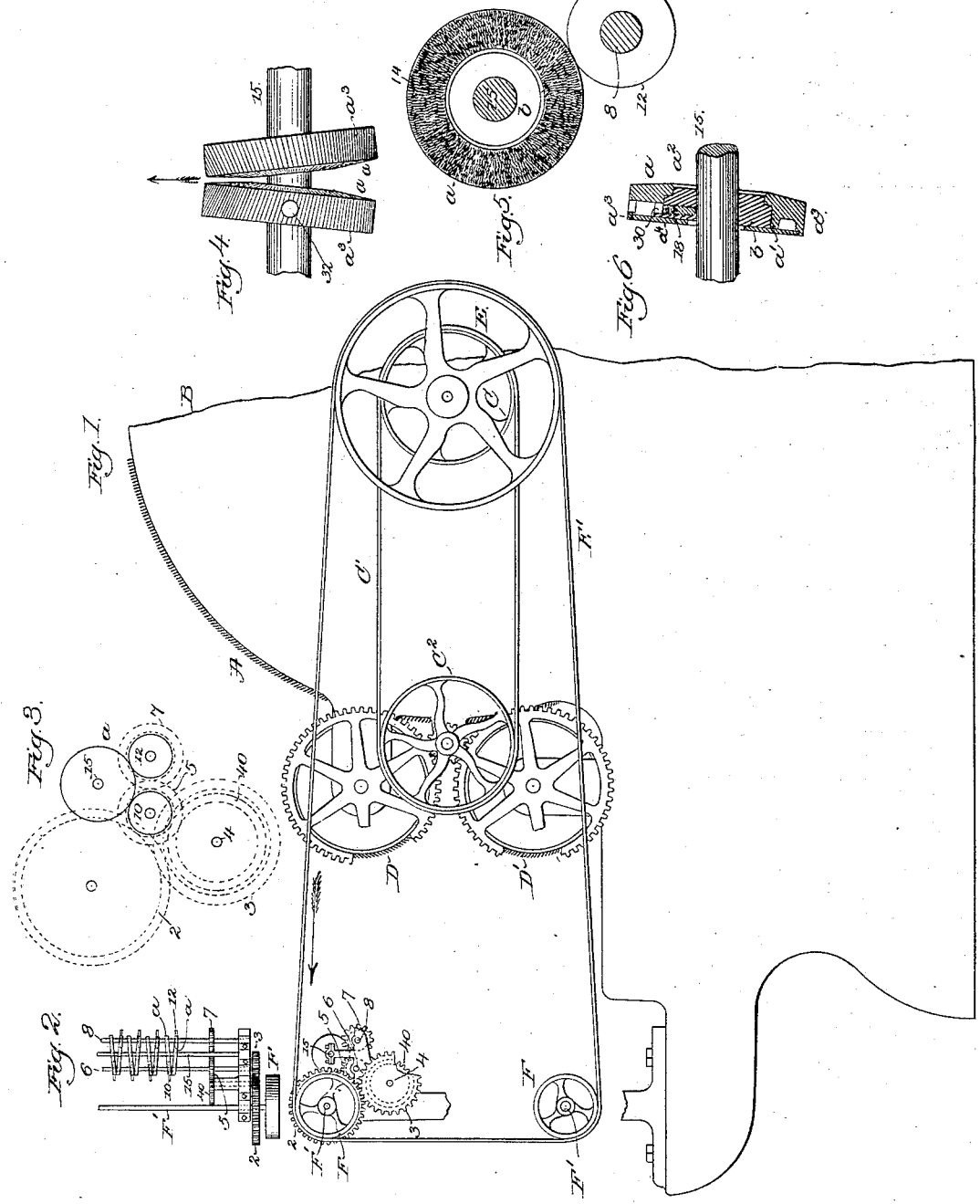
Witnesses
John F. C. Prindert
Henry Marsh
Inventor
Isaiah Newell
by Crosby & Gregory
att'ys

UNITED STATES PATENT OFFICE.

ISAIAH NEWELL, OF HAVERHILL, MASSACHUSETTS.

CONDENSER FOR WOOL-CARDING MACHINES.

SPECIFICATION forming part of Letters Patent No. 315,054, dated April 7, 1885.

Application filed March 22, 1884. (No model.)

*To all whom it may concern:*

Be it known that I, ISAIAH NEWELL, of Haverhill, county of Essex, State of Massachusetts, have invented an Improvement in Condensers for Wool-Carding Machines, of which the following description, in connection with accompanying drawings, is a specification, like letters on the drawings representing like parts.

My invention is an improvement on that class of condensers wherein a series of converging disks, rotated in opposite directions, receive between them and act upon the slivers taken from the doffer, the said disks being used instead of the usual reciprocating condensing-rollers.

In the class of apparatus referred to the disks, driven by belts, have been placed on studs of a sliver-guide connected with a shaft parallel with the doffer-shaft, and the faces of the disks have been provided with leather to come against the sliver.

When the disks are mounted centrally upon and are rotated about small studs, as heretofore, the disks soon wabble, owing to wear between them and the studs on which they run, and the roping is made uneven.

In accordance with my invention, the faces of the disks are scored or milled, thus avoiding the employment of the usual leather facing.
The hubs of my improved disks are mounted upon diagonally-bored cylindrical collars secured side by side upon a stationary shaft, the adjustment of the collars about the said shaft causing the faces of the disks to be placed in a more or less inclined position with relation to each other and to the longitudinal center of the said shaft, the disks being inclined toward or away from each other to the right or left in the direction of the length of the said shaft, according to the positions of the said collars. Supporting the disks on the peripheries of the collars, such as referred to, enables them to be run more steadily, thus securing the production of better work, and the apparatus is made more durable. The disks have backwardly-extended flanges parallel with their hubs, and are rotated in opposite direction by suitable gears, preferably friction-gears, on two rotating shafts parallel with the shaft on which the disk-supporting collars are secured.

Figure 1 in side elevation represents a sufficient portion of an ordinary finishing-card to illustrate one manner of applying my invention thereto. Fig. 2 is a partial top view of the left-hand portion of the same, sufficient to show the manner of driving my improved condensers. Fig. 3 is a diagram on a larger scale of the gearing for driving the shafts which actuate the condensers from the gear on one of the rollers which take the slivers from the condensers; Fig. 4, a detail on a larger scale, showing one pair of my improved condensing-disks; Fig. 5, a detail showing a face view of one of my disks with a driving-gear under it, the shaft holding the hub which supports the disk and the shaft for the gear being in section; and Fig. 6 is a section showing a disk and its hub on its supporting-shaft, the latter being in elevation.

The main card-clothed cylinder A, framework B, (partially shown,) the belt-pulley C, on the main shaft of the cylinder A, the pulley $C^2$, belt C', doffer-cylinders D D', and gearing to move them are all as in usual wool-carding machines. The shaft of the main cylinder has a pulley, E, which drives a belt, E', extended over two like pulleys, F, on shafts F', extended across the frame-work and serving, as usual, to drive one of the rollers of the usual set of three rollers commonly employed to draw the sliver from the condensers and doffers. As so far described the parts are as in common use in connection with so-called "finishing-cards" of wool-carding machinery. The two shafts F' being alike, I need describe but one of them and its connections by or through which to drive my improved condensers, it being understood that in practice there will be a set of condensers for each doffer, and that in front of each doffer and co-operating with it there will be a roller-stripper. (Not shown, as the same is common.) The shaft F' has a gear, 2, having, preferably, forty teeth, which engages a gear, 3, having, preferably, about thirty teeth, it being on a short shaft, 4, having at its inner end a gear, 40, having about twenty-four teeth. The gear 40, close to the inner side of the frame-work, will engage a gear, 5, having, preferably, about sixteen teeth, and fast on a shaft, 6, which will be extended across the frame-work parallel with the shafts of the doffer-rolls. The gear 5 will engage a gear, 7, of the same size, on a shaft, 8, also extended across the frame-work parallel with the shaft 6, and each of these shafts will have a series of driving-gears, those on shaft 6 being marked 10, while those on shaft 8 are marked 12, the said driving-gears operated or turned in opposite directions and made, preferably, as friction-gears, being so placed with relation to each other as to alternate—i. e., a gear, 10, being on the shaft 6 opposite a space on the shaft 8, and vice versa. These gears are placed at such distances apart that one acts upon and drives one disk of my improved condenser in one direction, while the gear next to it, but on the other shaft, engages and drives the fellow condenser in the opposite direction. One pair of my improved condensers is shown in Fig. 4, and one condenser-disk is shown in section in Fig. 6. Each disk $a$ of my improved condenser has a hub, $a'$, bored straight through its center, but so as to leave a shoulder, $a^2$, and it also has a backwardly-extended flange, $a^3$, which is preferably shouldered, as shown, to receive a back plate, $a^4$, which is placed therein and secured by a suitable screw after placing the disk on one of the diagonally-bored collars $b$. (See Fig. 6.) The face of each disk is scored or milled, as at 14. (Shown best in Fig. 5.) A stationary shaft, 15, is extended across the frame-work parallel with, but between and above the two shafts 6 and 8. This shaft 15 has placed upon it a series of diagonally-bored circular collars, $b$, with the disks $a$ mounted thereon, and the collars are then rotated about the shaft 15 until the said collars are in such position with relation thereto as to cause the disks of each pair of disks to converge one toward the other, so that their fluted or milled faces will travel more or less closely together at that side of the said shaft 15 which is farthest from the main cylinder A, thus enabling the said disks to act upon and put into the sliver passed between them and across shaft 15 the requisite amount of twist, the said twist extending substantially to the usual stripper employed in front of and to take the slivers from the doffers. The driving-gears 10 12 act directly against the backwardly-extended flanges of the disks, and rotate the latter upon the described stationary collars $b$ in a plane at an angle to the axis of the shaft 15. The shoulder $a^2$ and the back plate, $a^4$, act to retain the collar and disk in proper position.

I do not desire to limit my invention to the particular form of mechanism employed to rotate the disks, as they may be rotated in any usual manner. The collars $b$ are held in place upon the shaft by a screw, as at 18. An obvious modification of my invention would be to provide the shaft 15 with a series of fixed collars having their peripheries set at an inclination to the center line of the shaft.

In other condensing apparatus of the class herein referred to the disks have revolved at the sides of stationary guides, which plan is objectionable, because loose fiber floating in the air about the card and in the card-room settles thereon, and the material so accumulating on the upper series of guides is apt to drop upon the slivers, passing to the lower series of condensers, thus forming bunches on the roping produced from the sliver.

In my invention these stationary guides, with exposed surfaces on which the fiber may collect, are avoided, and the exposed parts of the condensers are always in motion. Each hub is fastened upon its shaft 15 by a screw, 18, the head of which is engaged by a screw-driver passed through a hole, 32, in the flange $a^3$, which is preferably scored or fluted to thus increase its roughness, in order the better to rotate it by pressure against it of the friction-gear which drives it.

In Fig. 4 the arrow designates the direction of movement of the sliver.

I claim—

1. The shaft, the diagonally-bored collars thereon, and the disks mounted loosely on the collar with their faces converged one toward the other, combined with the driving-gears to act against and rotate the said disks, and with means, substantially as described, to rotate the said gears, as set forth.

2. A shaft and two attached diagonally-bored collars, combined with two condenser-disks having their faces fluted or milled to act directly against the sliver between them, and mounted on the said collars, as described, whereby the faces of the said disks are made to converge each toward the other, and the disks are left free to be revolved upon the said collars in a plane inclined with relation to the axis of the said shaft, substantially as described.

In testimony whereof I have signed my name to this specification in the presence of two subscribing witnesses.

ISAIAH NEWELL.

Witnesses:
WINFIELD S. PETERS,
CHARLES H. POOR.